United States Patent [19]

Ono et al.

[11] Patent Number: 5,008,532

[45] Date of Patent: Apr. 16, 1991

[54] LIGHT RECEPTION SIGNAL CIRCUIT FOR PHOTOELECTRIC SWITCH

[75] Inventors: Shoichi Ono, Suwa; Atsuhito Kobayashi, Okaya, both of Japan

[73] Assignee: Chinon Kabushiki Kaisha, Suwa, Japan

[21] Appl. No.: 394,213

[22] Filed: Aug. 15, 1989

[51] Int. Cl.$^5$ ............... G01V 9/04; H03G 3/10
[52] U.S. Cl. ............... 250/222.1; 250/214 AG; 250/221; 330/284; 330/144; 307/360
[58] Field of Search ............... 307/360, 264; 330/284, 330/144; 250/221, 222.1, 229, 231.19, 214 R, 214 AG, 214 A; 340/555, 556, 557

[56] References Cited

U.S. PATENT DOCUMENTS

| | | | |
|---|---|---|---|
| 4,064,509 | 12/1977 | Stockdale | 340/556 |
| 4,078,233 | 3/1978 | Frye | 330/284 |
| 4,097,732 | 6/1978 | Krause et al. | 250/214 B |
| 4,133,008 | 1/1979 | Tisue | 250/214 AG |
| 4,179,691 | 12/1979 | Keller | 307/360 |
| 4,301,445 | 11/1981 | Robinson | 330/284 |
| 4,459,475 | 7/1984 | Flint et al. | 250/214 AG |
| 4,517,526 | 5/1985 | Di Cicco | 330/284 |
| 4,807,167 | 2/1989 | Green, Jr. | 330/284 |

FOREIGN PATENT DOCUMENTS 0202601 11/1986 European Pat. Off.

Primary Examiner—David C. Nelms
Assistant Examiner—Michael Messinger
Attorney, Agent, or Firm—Thomas R. Morrison

[57] ABSTRACT

The light reception signal circuit for photoelectric switch includes a photoelectric conversion circuit for receiving light from a light emitting part controlled for periodic emission. The photoelectric conversion circuit generates an electrical signal corresponding to the quantity of the received light. A programmable attenuator receives the output electrical signal, and attenuates it in even step in response to a digital control signal. A first comparator compares the output voltage with a predetermined upper bound threshold. The first comparator generates a clock signal when the output voltage exceeds the upper bound threshold. A peak holding circuit for receives an output voltage of the programmable attenuator, and holds the peak value of the output voltage on a time constant that is much longer than an emission period of the light emitting part. A second comparator compares the output voltage of the peak holding circuit with a predetermined lower bound threshold and generates an outgoing signal when the output voltage decreases below the lower bound threshold. A counter counts the clock pulses thereby generating a digital control signal for increasing the attenuation of the programmable attenuator. The counter is reset outgoing signal of the second comparator. A third comparator compares the output voltage of the programmable attenuator with a predetermined decision level to produce the detection output of the photoelectric switch.

14 Claims, 5 Drawing Sheets

LIGHT RECEPTION SIGNAL CIRCUIT FOR PHOTOELECTRIC SWITCH

BACKGROUND OF THE INVENTION

1. Field of the Invention

This invention relates to a light reception signal circuit for a photoelectric switch intended for detecting the presence of an object by means of a beam of infrared light or the like.

2. Description of the Prior Art

A photoelectric switch detects the presence or absence of an object according to whether or not a beam of light such as, for example, an infrared beam is intercepted by the object. A photoelectric switch may be a transmission type as shown in FIG. 6 or a reflection type as shown in FIG. 7.

The transmission type of photoelectric switch shown in FIG. 6 includes a light emitting part 11 and a light receiving part 12 disposed opposite each other. An object 13 (a moving member, for example) may be interposed therebetween. A light beam 14 such as an infrared beam is emitted from the light emitting part 11 toward the light receiving part 12. In the reflection type device of FIG. 7, a light emitting/receiving part 15 functions as both a light emitting part and a light receiving part at the same time. A reflecting plate 16 is disposed opposite to the light emitting/receiving part 15. An object 13 may be interposed therebetween. The light beam 14 from the light emitting/receiving part 15 is reflected from the reflecting plate 16 and returned to the light emitting/receiving part 15.

Both of the above types generate an electrical signal responsive to the amount of the light beam 14 received. If the light beam 14 is intercepted by the object 13, a change (reduction) takes place in the electrical signal. Thus the presence or absence of the object 13 at a predetermined position is detected.

FIG. 8 represents a prior art light reception signal circuit for detecting whether or not the light 14 is intercepted. In the drawing, a reference character $OP_1$ denotes an operational amplifier used as a photoelectric conversion circuit. A photoelectric conversion element, or a photodiode PD is connected, in the direction illustrated, between the plus (+) input and the minus (−) input of operational amplifier $OP_1$. A constant voltage $V_{ref}$ is impressed on the plus (+) input of operational amplifier $OP_1$. A variable resistor $R_1$ is connected between output and the minus (−) input of operational amplifier $OP_1$.

A reference character $OP_2$ denotes an operational amplifier used as a voltage amplifier circuit. The constant voltage $V_{ref}$ is applied to the plus (+) input of operational amplifier $OP_2$. An output voltage $V_1$ of the operational amplifier $OP_1$ is applied to the minus (−) input of operational amplifier $OP_2$ through an input resistance $R_2$. A feedback resistance $R_3$ is connected between the output and the minus (−) input of operational amplifier $OP_2$.

A reference character $OP_3$ denotes a voltage comparator (hereinafter called a comparator). An output voltage $V_2$ of the operational amplifier $OP_2$ is applied to the plus (+) input of comparator $OP_3$. The voltage $V_2$ is compared with a standard voltage $V_s$ to produce an output voltage $V_3$.

In the aforementioned construction, when the light beam 14 is not intercepted by the object 13, the voltage $V_2$ is larger than the standard voltage $V_s$. The output voltage $V_3$ of the comparator $OP_3$ is at the "H" level. On the other hand, if the light beam 14 is intercepted by the object 13, the output voltage $V_2$ is lower than the standard voltage $V_s$, and the output voltage $V_3$ of the comparator $OP_3$ decreases to the "L" level. That is, the output voltage $V_3$ of the comparator $OP_3$ generates a signal at the "H" or "L" level according to the position of the object 13. In this way, the presence or absence of the object 13 can be detected.

If a measuring range (distance) l in FIG. 6 and FIG. 7 is reduced, the quantity of received light increases. If object 13 is small, or translucent, or is displaced from the center of the light beam 14, enough light may pass the object 13 to maintain the voltage $V_2$ above the standard voltage $V_s$. In this condition the presence of the object 13 cannot be detected.

To prevent such erroneous operation due to a change in the distance l, the photocurrent produced by photodiode PD is controlled by adjustment of the variable resistor $R_1$. In this way the output voltage $V_2$ applied to the comparator $OP_3$ is adjusted to an appropriate voltage, such as, for example, $V_2 = 2\ V_s$.

The aforementioned control is effected by a user by manually adjusting the variable resistor $R_1$ whenever the distance l is changed or following initial installation. When installed outdoors, the quantity of light may decrease due to mist, dust and the like. Such a decrease in light may likewise be compensated for by adjustment of the variable resistor $R_1$.

SUMMARY OF THE INVENTION

It is an object of the invention to provide a light reception signal circuit for a photoelectric switch which provides an appropriate light reception signal at all times without requiring manual adjustment to compensate for a change in the quantity of received light due to a change in distance, or propagation conditions.

The light reception signal circuit for a photoelectric switch according to the invention has a photoelectric conversion circuit for receiving a light from a light emitting part controlled to emit periodically, and to thereby generate an electrical signal corresponding to the quantity of the received light. A programmable attenuator attenuates the output electrical signal stepwise to a constant level in response to a digital control signal. A first comparator compares the output voltage with a predetermined upper bound threshold and generates a clock signal whenever the output voltage exceeds the upper bound threshold. A peak holding circuit receives an output voltage of the programmable attenuator, and holds the peak value of the output voltage on a time constant that is very long compared to the emission period of the light emitting part. A second comparator compares an output voltage of the peak holding circuit with a predetermined lower bound threshold and generates a reset signal when the output voltage is equal to, or less than, the lower bound threshold. A counter counts the cycles of the outgoing signal and generates a digital control signal for stepping up an attenuation level of the programmable attenuator when the output level is too high. The counter is reset when the outgoing signal decreases below a low threshold. This removes all attenuation. The output of the photoelectric switch is generated by a comparison of the output voltage of the programmable attenuator with a predetermined decision level set beforehand.

The photoelectric conversion circuit switches amplification gain when the counter reaches its minimum content (maximum attenuation). This doubles the operating range.

In the invention, if the quantity of received light is too high for short distance or other reason, and thus an output voltage of the programmable attenuator exceeds the upper bound threshold of the first comparator, an outgoing signal of the first comparator is counted on the counter, and attenuation by the programmable attenuator is advanced one step for each count of the counter. This continues until the electrical signal attenuated by the programmable attenuator is reduced below the upper threshold. If the quantity of received light decreases because of increased distance, mist, dust or the like, and the peak value of the output voltage of the programmable attenuator is reduced below the lower bound threshold of the second comparator, the counter is reset and the programmable attenuator is returned to zero attenuation. If the output voltage of the programmable attenuator exceeds the upper bound threshold at this time, attenuation control of the programmable attenuator resumes to increase the attenuation until the output voltage is within the upper bound threshold. Thus, the output voltage of the programmable attenuator is kept within a narrow range. Accordingly, a stable and accurate identification signal is obtainable.

According to an embodiment of the invention, there is provided a photoelectric switch of a type adapted for use with a pulsating light beam having an emission period, comprising: means for detecting the pulsating light beam to produce a light detection signal, means for attenuating the light detection signal to produce an output signal, means for producing a pulsating clock signal synchronized with pulsations of the pulsating light beam when the output signal exceeds a predetermined upper threshold, control means, responsive to the pulsating clock signal, for producing a digital control signal, the means for attenuating being responsive to the digital control signal to add a predetermined amount of attenuation each time the pulsating clock signal is produced, and means for removing a predetermined amount of attenuation from the light detection signal when the output signal falls below a predetermined lower threshold, whereby the output signal is maintained in a range between the upper threshold and the lower threshold.

According to a feature of the invention, there is provided a method for operating a photoelectric switch for use with a pulsating light beam having an emission period, comprising: detecting the pulsating light beam to produce a light detection signal, attenuating the light detection signal to produce an output signal, producing a pulsating clock signal synchronized with pulsations of the pulsating light beam when the output signal exceeds a predetermined upper threshold, producing a digital control signal responsive to the pulsating clock signal, adding a predetermined amount of attenuation each time the pulsating clock signal is produced, and removing a predetermined amount of attenuation from the light detection signal when the output signal falls below a predetermined lower threshold, whereby the output signal is maintained in a range between the upper threshold and the lower threshold.

According to a further feature of the invention, there is provided apparatus for detecting the passage of an object through a pulsating light beam, the pulsating light beam having a period, comprising: means for detecting the pulsating light beam to produce a light detection signal, means for attenuating the light detection signal to produce an output signal, means for producing a pulsating clock signal synchronized with pulsations of the pulsating light beam when the output signal exceeds a predetermined upper threshold, control means, responsive to the pulsating clock signal, for producing a digital control signal, the means for attenuating being responsive to the digital control signal to add a predetermined amount of attenuation each time the pulsating clock signal is produced, means for removing a predetermined amount of produced, means for removing a predetermined amount of attenuation from the light detection signal when the output signal falls below a predetermined lower threshold, whereby the output signal is maintained in a range between the upper threshold and the lower threshold, means for holding a peak of the output signal on a time constant that is long compared to the emission period, to produce a stored peak signal, means for comparing a decision voltage related to the stored peak signal with a output voltage to produce an alternating final output signal when the object does not intercept the light beam to the means for detecting, and the means for comparing providing a constant fainal output signal when the object intercepts the light beam, whereby the presence of the object in an intercepting position is detected.

According to a still further feature of the invention, there is provided a method for detecting the passage of an object through a pulsating light beam, the pulsating light beam having a period, comprising: detecting the pulsating light beam to produce a light detection signal, attenuating the light detection signal to produce an output signal, producing a pulsating clock signal synchronized with pulsations of the pulsating light beam when the output signal exceeds a predetermined upper thereshold, control means, responsive to the pulsating clock signal, for producing a digital control signal, the step attenuating including adding a predetermined amount of attenuation each time the pulsating clock signal is produced, removing a predetermined amount of attenuation from the light detection signal when the output signal falls below a predetermined lower threshold, whereby the output signal is maintained in a range between the upper threshold and the lower threshold, holding a peak of the output signal on a time constant that is long compared to the emission period, to produce a stored peak signal, comparing a decision voltage related to the stored peak signal with a output voltage to produce an alternating final output signal when the object does not intercept the light beam to the means for detecting, and the step of comparing providing a constant final output signal when the object intercepts the light beam, whereby the presence of the object in an intercepting position is detected.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The invention will now be described with reference to the accompanying drawings representing one preferred embodiment thereof.

Figure 1:
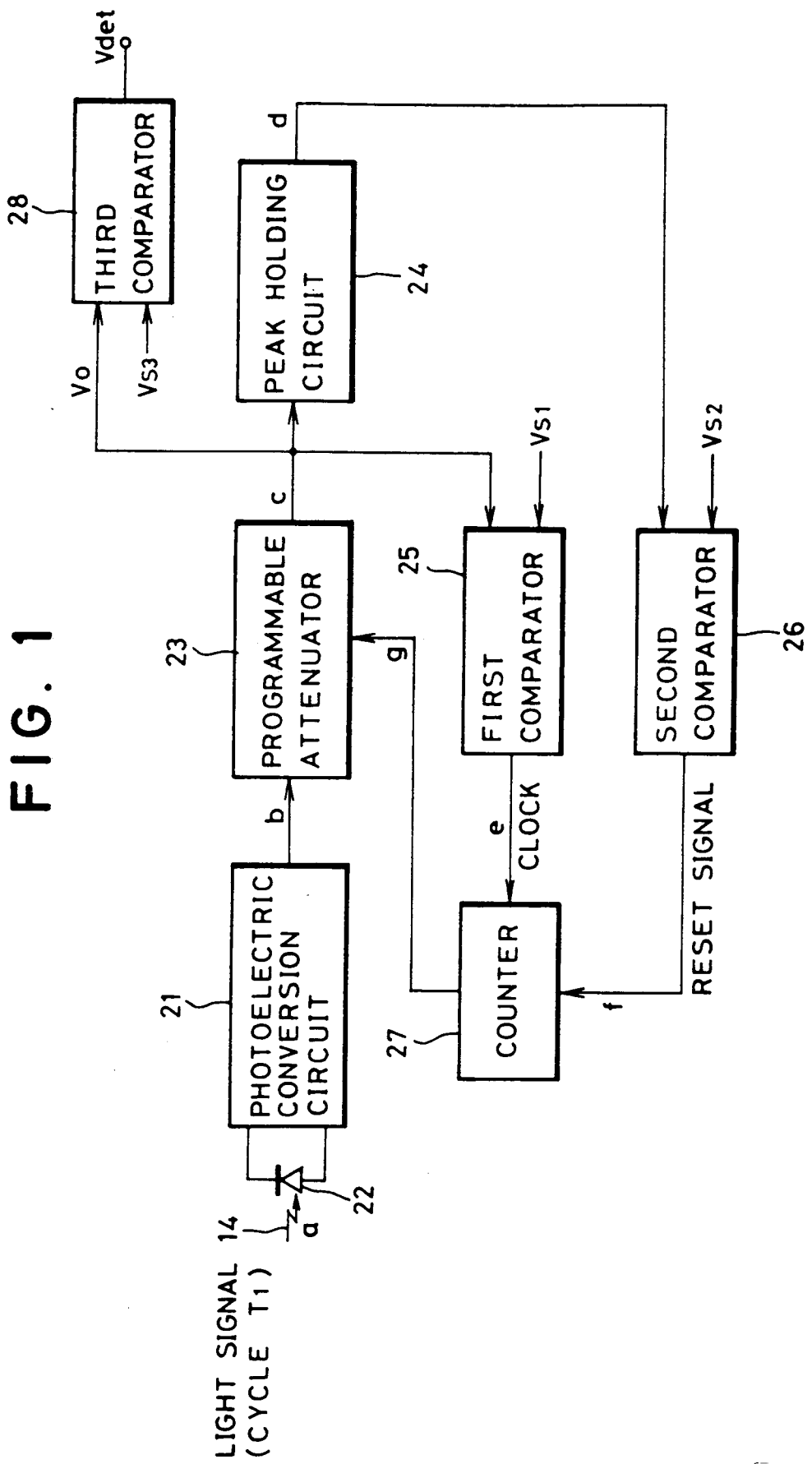
FIG. 1 is a block diagram of a light reception signal circuit for a photoelectric switch according to one embodiment of the invention.
Figure 6:
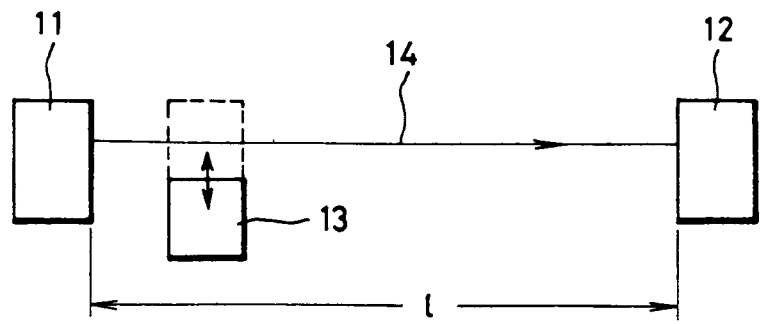
FIG. 6 is a simplified block diagram of a transmissive photoelectric switch.
Figure 7:
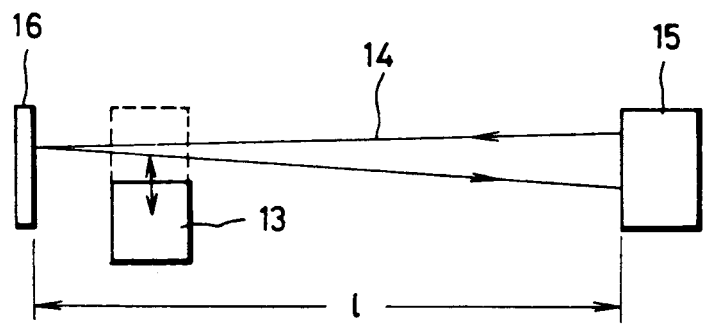
FIG. 7 is a simplified block diagram of a recurrent reflection type photoelectric switch.
Figure 8:
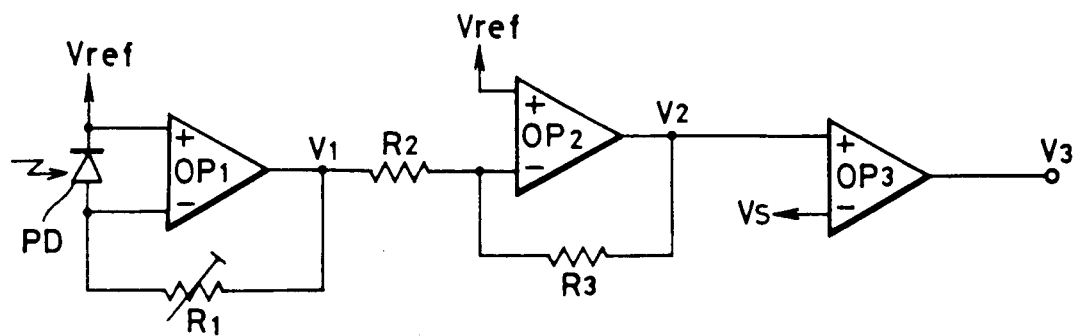
FIG. 8 is a schematic diagram of a light reception signal circuit according to the prior art.

In FIG. 1, a reference character 21 denotes a photoelectric conversion circuit having a photoelectric conversion element 22, such as photodiode or the like, connected to its input. The light beam 14 from the light emitting part (not shown in FIG. 1) is incident on the photoelectric conversion element 22. The positional relation of the light emitting part with respect to the elements in FIG. 1 is shown in FIG. 6 or FIG. 7. An object to be identified may be positioned in the light beam 14 to block the light from the light emitting part. The light emitting part emits a flickering light beam 14 having a preset period.

A reference character 23 denotes a programmable attenuator (hereinafter abbreviated to ATT), which receives a pulsating electrical signal generated by the photoelectric conversion circuit 21 and attenuates the electrical signal to a preset constant level according to a digital control signal which will be described hereinafter.

A reference character 24 denotes a peak holding circuit, that receives a pulsating electrical signal from ATT 23 and holds the peak value of its input on a time constant that is very long compared to the period of the light beam 14. The time constant is much longer than the rate at which the object 13, (FIGS. 6 and 7) moves through the light beam 14. The time constant is also much longer than the emission period of the light emitting part.

A reference character 25 denotes a first comparator, which compares a voltage level of the pulsating electrical signal from ATT 23 with a preset upper bound threshold $V_{s1}$, and generates an electrical clock signal e whenever the voltage level exceeds the upper bound threshold $V_{s1}$.

A reference character 26 denotes a second comparator, which compares the output voltage of the peak holding circuit 24 with a preset lower bound threshold $V_{s2}$, and generates an electrical reset signal f whenever the output voltage decreases below the lower bound threshold $V_{s2}$.

A reference character 27 denotes a counter, which counts the electrical clock signals e generated by the first comparator 25. An outgoing signal of the counter 27 is input as a digital control signal g to ATT 23. For example, in the case of a 4-bit down-counter, if the initial value is "1111", counter 27 counts down "1110", "1101", "1100", . . . as clock signal e is counted. The 4-bitdigital control signal g increases the attenuation in ATT 23 by a preset constant amount, or −2 dB, at each count. The reset signal f generated from the second comparator 26 is applied as a reset signal to counter 27 to return its count to the starting point so that the digital control signal is reset to its initial value "1111" when the reset signal is received. ATT 23 is controlled to return to zero attenuation when the digital control signal is reset to its initial value "1111".

A reference character 28 denotes a third comparator, which receives the output signal voltage $V_0$ of ATT 23 at one input and a decision level voltage $V_{s3}$ at a second input. The third comparator 28 generates an outgoing signal $V_{det}$ from the photoelectric switch as a result of the comparison of the signal voltage $V_0$ with the decision level voltage $V_{s3}$.

In the aforementioned construction, a light beam 14, such as infrared ray or the like, is projected from the light emitting part (not indicated in FIG. 1) pulsating at a predetermined period $T_1$. If there is no object present in the path of the light beam 14 to the photoelectric conversion element 22, the light is incident on the photoelectric conversion element 22 at a period $T_1$ equal to an emission period $T_1$ of the light emitting part. Upon incidence of the light beam 14, a pulsating electrical signal b is generated having a period $T_1$ and a magnitude according to a quantity of the light beam 14. The pulsating electrical signal b is attenuated in ATT 23 a predetermined amount determined by to the digital control signal g from the counter 27, to produce an output part c.

Figure 2A:
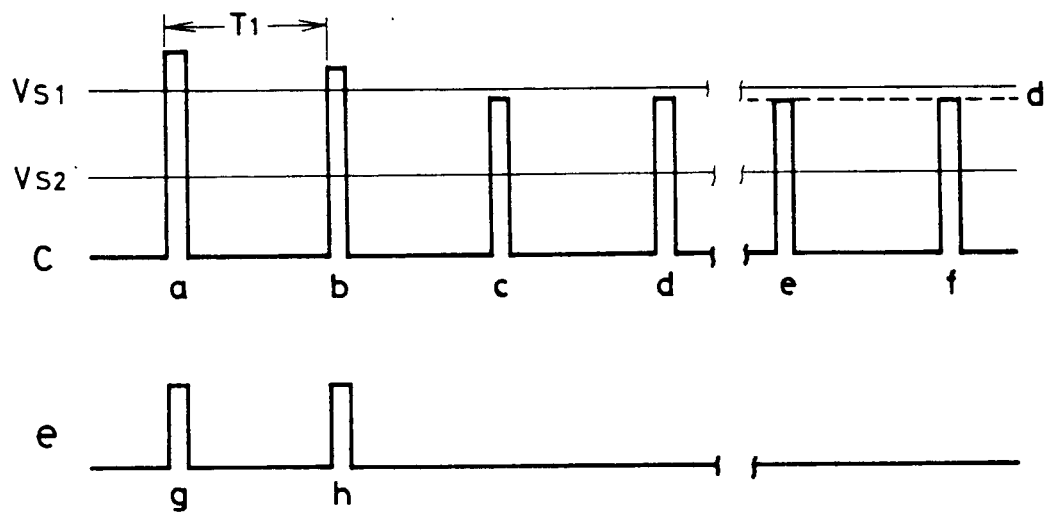
FIGS. 2A and 2B are time charts to which reference will be made in describing the operation of the circuit in FIG. 1.
Figure 2B:
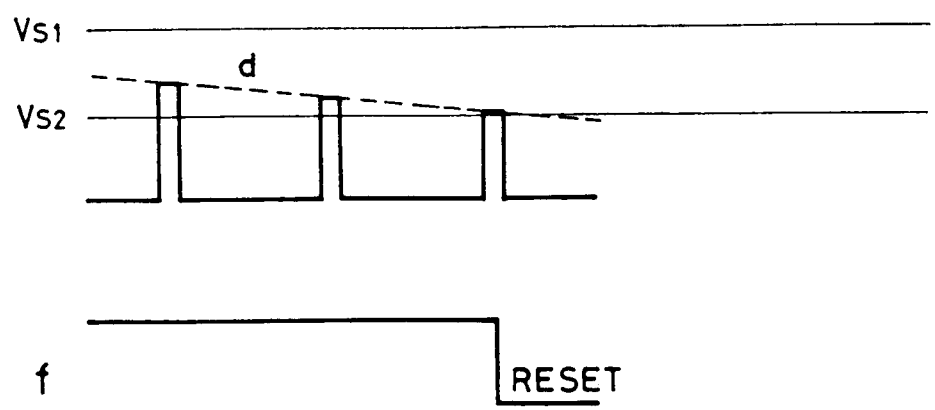

The output part c from the ATT 23 is such that ATT 23 initialized (the digital control signal being "1111"), and an attenuation is zero, for example, as shown in FIG. 2 (A). When the light beam 14 is received an unattenuated pulsating electrical signal a is generated on the output part c of ATT 23. The electrical signal a is compared with the upper bound threshold $V_{s1}$ by the first comparator 25. When the pulsating electrical signal a exceeds the upper bound threshold $V_{s1}$ as illustrated, a pulsating outgoing signal g is generated on an output part e of the first comparator 25. The outgoing signal g is counted by the counter 27. The count in counter 27 is reduced by one so that the digital control signal g reads "1110". This increases the attenuation of ATT 23 by a preset constant amount (−2 dB).

Consequently, the next time the light beam 14 is received, the level of the electrical signal b from ATT 23 is −2 dB less than during the previous time. In the case illustrated since the level of the electrical signal b still exceeds the upper bound threshold $V_{s1}$, a signal h is generated by the comparator 25 as before. Thus, the counter 27 again counts down one count and increases the attenuation of ATT 23 by the predetermined amount (−2 dB).

Eventually, the level of the electrical signal generated on the output part c of ATT 23 is reduced below the upper bound threshold $V_{s1}$. The first comparator 25 no longer generates a pulsating clock signal c. Operation of the counter 27 comes to a stop. Thus, the attenuation of ATT 23 is kept at a level just below the upper bound threshould $V_{s1}$.

The peak value of the electrical signal at the output end c of ATT 23 is held on a long time constant by the peak holding circuit 24 to produce a voltage signal indicated by a broken line in FIG. 2 (A) on the output end d. This voltage signal is compared with the lower bound threshold $V_{s2}$ in the second comparator 26. The level of the electrical signal generated on the output part c of ATT 23 is slightly below the upper bound threshold $V_{S1}$, as shown in FIG. 2 (A). The lower bound threshold $V_{S2}$ is below the upper bound threshold $V_{S1}$. As a result, when ATT 23 is initially controlled, as described above the peak value of the output from ATT 23 is above lower bound threshold $V_{S2}$. As a result, the second comparator 26 does not generate a reset signal f (reset signal of the counter 27), and the counting state of the counter 27 remains unchanged.

When the object 13 (moving member) intercepts the light beam 14, the output electrical signal $V_0$ of ATT 23 falls to zero (a value below decision level voltage $V_{S3}$). Consequently, the outgoing signal $V_{det}$ of the third comparator 28 is changed to generate a signal indicating that the object has been identified. If the emission period of the light emitting part is set correspondingly to the rate at which the object moves through the light beam 14, a predetermined number of pulsating electrical signals can be deleted by passage of the object. In one example the period is selected so that a single output signal voltage pulse $V_{det}$ is deleted. That is, in FIG. 2 (A), the emission period is set so that a pulsating electrical signal generated at the period $T_1$ annihilates a single pulse upon identification as the object moves through the light beam. The time constant of the peak holding circuit 24 is set to be long compared to the rate at which the object passes through the light beam 14. Thus, when a single pulse is deleted by identification of the object, the output voltage of the peak holding circuit 24 remains high enough to keep the second comparator 26 from generating a reset signal f for the counter 27. That is, the counter 27 is not reset during object identification.

On the other hand, if the received light beam 14 itself decreases due to mist, dust and the like, the decrease takes place slowly for a relatively long period of time as shown in FIG. 2 (B). The voltage on an output part d of the peak holding circuit 24 also drops at a slow rate controlled by its time constant. When the output of the peak holding circuit falls below the lower bound threshold $V_{S2}$, a reset signal is generated on an output part f of the second comparator 26. This resets the count value of the counter 27 to restore the digital control signal g to its initial value of "1111". ATT 23 reduces its attenuation to 0 dB. Consequently, the level of the outgoing signal $V_0$ of ATT 23 rises to $V_0 > V_{S2}$. The counter 27 is operated, as described above, whereby the attenuation of ATT 23 is increased until $V_{S1} > V_0 > V_{S2}$.

As described, an upper bound decision of the outgoing signal $V_0$ of ATT 23 and a resultant clock generation to the counter 27 are carried out in real time. Therefore the outgoing signal $V_0$ of ATT 23 is adjusted immediately with each pulse of the outgoing signal $V_0$ until the appropriate voltage level is reached. A lower bound decision is carried out based on the output of the peak holding circuit (analog memory) 24. Therefore a short-term decrease in the quantity of received light due to an interception of the light beam 14 by the object can definitely be discriminated from a slow decrease in quantity of received light due to mist, dust or the like. As a result, the outgoing signal $V_0$ of ATT 23 is kept automatically within a proper range at all times.

Figure 3:
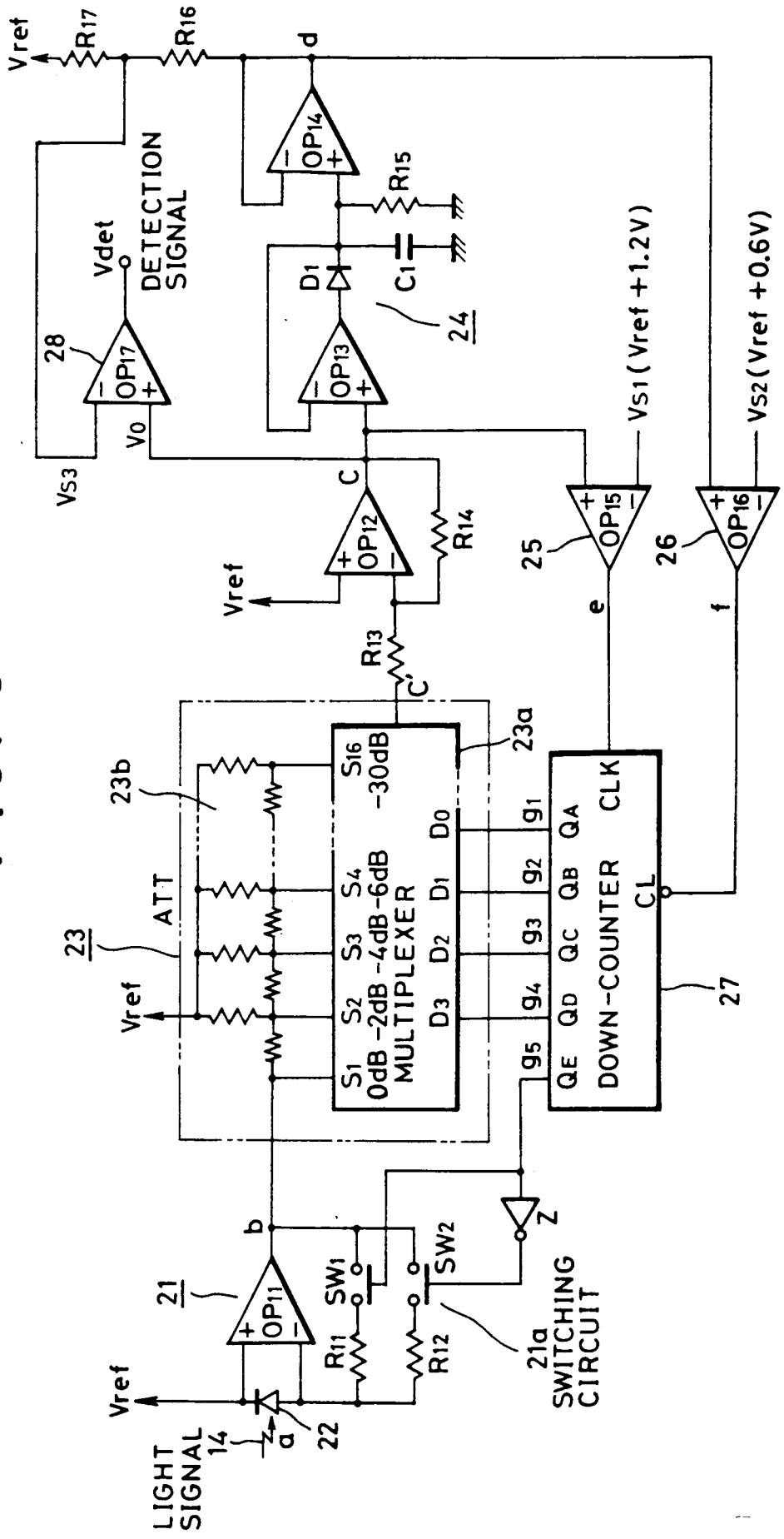
FIG. 3 is a circuit diagram showing a more detailed construction of the light reception signal circuit of FIG. 1.

FIG. 3 represents a concrete circuit configuration of each component shown in FIG. 1, with corresponding groupings contained within dash-dot blocks.

The photoelectric conversion circuit 21 has an operational amplifier $OP_{11}$ with the photoelectric conversion element 22 such as a photodiode, or the like, connected between its plus (+) input and its minus (−) input. A reference voltage $V_{ref}$ is applied to the plus (+) input of the operational amplifier $OP_{11}$. A feedback resistance is provided between the output and the minus (−) input of the operational amplifier $OP_{11}$. A switching circuit 21a includes two different feedback resistances $R_{11}$, $R_{12}$ selectively connected through electronically actuated switches $SW_1$, $SW_2$ respectively.

ATT 23 has a multiplexer 23a with an attenuating lattice resistance circuit 23b between its sixteen terminals $S_1, S_2, S_3, \ldots S_{16}$ and the output of the operational amplifier $OP_{11}$. Controlling input terminals (4-bit) $D_3$, $D_2$, $D_1$, $D_0$ of the multiplexer 23a are connected to output terminals $Q_D$, $Q_C$, $Q_B$, $Q_A$ of the counter (down-counter) 27. The 4-bit digital control signal g select one of the sixteen terminals $S_1$ to $S_{16}$ for receiving the output of the operational amplifier $OP_{11}$, and thereby selects the attenuation corresponding attenuation in lattice resistance circuit 23b. For example, when the 4-bit digital control signal is "1111", the terminal $S_1$ is selected, and the attenuation is 0 dB. If the 4-bit digital control signal is "1110", then the terminal $S_2$ is selected and the attenuation is −2 dB. The attenuation is correspondingly selected by the digital control signal g for the electrical signal through the remaining 14 terminals $S_3$–$S_{16}$, from whereby the output part b of the operational amplifier $OP_{11}$ is attenuated according to the selected input and then applied to an output part c'.

A voltage amplifier circuit consisting of an operational amplifier $OP_{12}$, an input resistance $R_{13}$, and a freedback resistance $R_{14}$ is connected to the output part c' of the aforementioned multiplexer, The output of the voltage amplifier circuit is the outgoing signal $V_0$ of ATT 23.

A 5-bit down-counter is used for the counter 27, of which the low-order 4-bit outputs $g_4$, $g_3$, $g_2$, $g_1$ work as the aforementioned digital control signal. The high-order fifth-bit output $g_5$ is applied for controlling the switches $SW_1$, $SW_2$ and thereby changing the feedback resistance $R_{11}$, $R_{12}$ of the photoelectric conversion circuit 23. That is, the output $g_5$ is normally "1". This keeps the switch $SW_1$ on. If a high-light condition permits counting on the counter 27 to advance beyond 16 counts, the output $g_5$ becomes "0", This turns off the switch $SW_1$. The same signal inverted in an inverter Z, turns on switch $SW_2$. In this way, two counting ranges are made available.

The peak holding circuit 24 has the operational amplifier $OP_{13}$ for receiving a signal from the operational amplifier $OP_{12}$ at its plus (+) input. An output of the operational amplifier 13 is connected to the plus (+) input of the operational amplifier $OP_{14}$ through forward conduction in a diode $D_1$. A cathode of the diode $D_1$ is connected to the minus (−) input of the operational amplifier $OP_{13}$. A parallel combination of a capacitor $C_1$ and a resistance $R_{15}$ is connected from the cathode of diode $D_1$ to ground thus forming a time constant circuit. An output of the operational amplifier $OP_{14}$ is connected to its minus (−) input. A reference voltage $V_{ref}$ is connected through resistances $R_{16}$, $R_{17}$ in series to the output of operational amplifier $OP_{14}$.

The first comparator 25, second comparator 26 and third comparator 28 comprise the operational amplifiers $OP_{15}$, $OP_{16}$, $OP_{17}$ respectively. Outgoing signal $V_0$ of ATT 23 on the output part c of the operational amplifier $OP_{12}$ is applied to the plus (+) inputs of the operational amplifiers $OP_{15}$, $OP_{17}$ of the first and third comparators 25 and 28. The output voltage on the output part d of the peak holding circuit 24 is applied to the plus (+)

input of the operational amplifier $OP_{16}$ of the second comparator 26. The upper bound threshold $V_{s1}$ ($V_{ref}+1.2$ V) is applied to the minus (−) input of the operational amplifier $OP_{15}$. The lower bound threshold $V_{s2}$ ($V_{ref}+0.6$ V) is applied to the minus (−) input of the operational amplifier $OP_{16}$. Further, the minus (−) input of the operational amplifier $OP_{17}$ is connected to a junction of the resistances $R_{17}$, $R_{16}$. The voltage on this junction is the decision voltage $V_{s3}$ applied to the minus (−) input of the operational amplifier $OP_{17}$.

An output e of the operational amplifier $OP_{15}$ is connected to a clock terminal CLK of the counter 27. A pulse signal from the output e of operational amplifier $OP_{15}$ is counted by the counter 27. An output end f of the operational amplifier $OP_{16}$ is connected to a clear terminal CL of the counter 27. A reset signal generated from the output end f of the operational amplifier $OP_{16}$ is connected to the reset or clear CL input of the counter 27. Further, the detection signal $V_{det}$ of the photoelectric switch is produced at an output of the operational amplifier $OP_{17}$.

The feedback resistances $R_{11}$, $R_{12}$ on the photoelectric conversion circuit 21 are related as $R_{11}=40\ R_{12}$. When the switches $SW_1$, $SW_2$ are reversed while the quantity of the received light signal 14 remains constant, the output of the operational amplifier $OP_{11}$ is increased or decreased by 32 dB. If output with the switch $SW_1$ turned on and switch $SW_2$ turned off is $b_1$. This is controlled by the feedback resistance $R_{11}$. When the switch $SW_1$ is turned off and the switch $SW_2$ is turned on, the feedback resistance is $R_{12}$ and the output is $b_2$. $b_2$ has a value of $b_1-32$ dB.

The feedback resistances $R_{11}$, $R_{12}$ controlled by the switches $SW_1$, $SW_2$ satisfies three points concurrently: (1) the control range of ATT 23 is doubled (0 to 62 dB) (2) saturation of the operational amplifier $OP_{11}$ is prevented, and (3) S/N ratio is enhanced.

The gain of operational amplifier $OP_{12}$ of the voltage amplifier circuit is +30 dB. Assuming that the dynamic range of the operational amplifiers $OP_{11}$ to $OP_{16}$ is 1.25 V each, a maximum value at the output part b of the photoelectric conversion circuit 21 is 1.25 V. This requires an attenuation in ATT 23 of −30 dB, and an output at the output part c′ of about 40 mV. If the output of the output part c′ were applied directly to the operational amplifier $OP_{15}$ of the first comparator, the signal level would be so low that offset voltage and noise would prevent accurate detection. Accordingly, the operational amplifier $OP_{12}$, having a gain of +30 dB, compensates for the −30 dB of attenuation in ATT 23. The maximum value of the ouput part c is then 1.25 V, as required.

If the outgoing signal $V_0$ exceeds the upper bound threshold $V_{s1}$, a pulse signal, synchronized with the emission period, is generated from the operational amplifier $OP_{15}$ until $V_0 < V_{s1}$. The pulse signal is counted by the counter 27 as a clock pulse. ATT 23 is controlled by a digital control signal from the counter 27. An initial value of the outputs g ($g=g_5, g_4, g_3, g_2, g_1$) of the counter 27 is "11111". This sets the attenuation in ATT 23 to 0 dB. The switch $SW_1$ is turned on, and the switch $SW_2$ is turned off. The output g is counted down whenever the clock is counted. Then, if the relationship $V_0 > V_{s1}$ still exists when counting has advanced to g=10000 (ATT 23 being −30 dB), g changes to 01111 on the next clock pulse. Thus, the switch $SW_1$ is turned off, $SW_2$ is turned on, and the output part b is reduced −32 dB. ATT 23 is reset to 0 dB. If the condition $V_0 > V_{s1}$ continues thereafter, further counting (counting down) of the counter 27 resumes, thus adding an attenuation of −2 dB at each count. As a result, the control range light is expanded to 0 to 62 dB, as described hereinbefore.

The following table relates the voltages at points b and c in FIG. 1, to the count in the counter 27, and the attenuation level (dB) of ATT 23 as the measuring distance l is changed from 0.4 m to 25 m in a transmissive photoelectric switch.

| Distance [m] | Voltage at b point [V] | Voltage at c point [V] | Counted value | | | | | ATT [dB] |
|---|---|---|---|---|---|---|---|---|
| | | | $g_5$ | $g_4$ | $g_3$ | $g_2$ | $g_1$ | |
| 0.5 | 1.030 | 1.14 | 0 | 0 | 0 | 0 | 1 | −60 |
| 1.0 | 0.800 | 0.90 | 0 | 0 | 0 | 0 | 1 | −60 |
| 2.0 | 0.535 | 0.93 | 0 | 0 | 0 | 1 | 1 | −56 |
| 4.0 | 0.320 | 0.89 | 0 | 0 | 1 | 0 | 1 | −52 |
| 6.0 | 0.193 | 0.86 | 0 | 0 | 1 | 1 | 1 | −48 |
| 8.0 | 0.118 | 0.82 | 0 | 1 | 0 | 0 | 1 | −44 |
| 10.0 | 0.082 | 0.92 | 0 | 1 | 0 | 1 | 1 | −40 |
| 12.0 | 0.059 | 1.02 | 0 | 1 | 1 | 0 | 1 | −36 |
| 14.0 | 0.045 | 1.08 | 0 | 1 | 1 | 1 | 0 | −34 |
| 16.0 | 1.220 | 1.06 | 1 | 0 | 0 | 0 | 0 | −30 |
| 18.0 | 0.840 | 0.94 | 1 | 0 | 0 | 0 | 1 | −28 |
| 20.0 | 0.710 | 1.01 | 1 | 0 | 0 | 1 | 0 | −26 |
| 22.0 | 0.620 | 1.11 | 1 | 0 | 0 | 1 | 1 | −24 |
| 24.0 | 0.530 | 1.18 | 1 | 0 | 1 | 0 | 0 | −22 |

As will be apparent from the table above, the voltage at b point rises as the measuring distance l is reduced, assuming that the emitted light remains constant. As the voltage at point b increases, the counter 27 advances, and the attenuation in ATT 23 increases. The voltage at point c thus is brought into a stable range.

Figure 5:
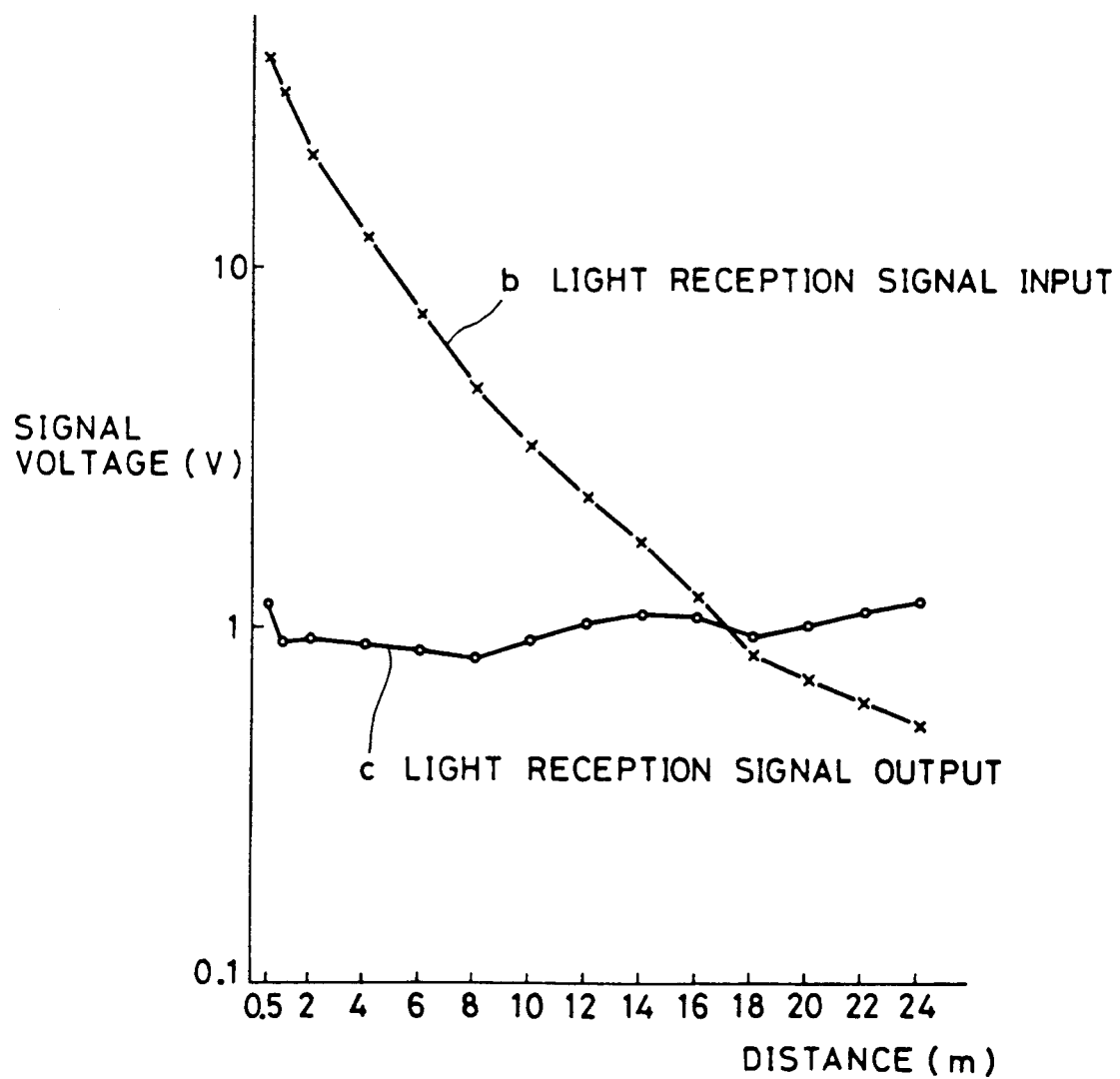
FIG. 5 is a set of curves illustrating an operation of the invention.

FIG. 5 indicates the above relation in a graph. The voltage at point b (light reception signal input) of FIG. 5 is a value obtained through equivalent conversion of the feedback resistances $R_{11}$, $R_{12}$, and hence is indicated in proportion to a light input.

A value obtained from dividing a voltage generated on the output part d of the peak holding circuit 24 by resistances $R_{16}$ and $R_{17}$ is used for the decision voltage $V_{s3}$ of the operational amplifier $OP_{17}$ of the third comparator. When $R_{16}=R_{17}$, $V_{s3}$ is half the voltage on the output part d.

The decision voltage $V_{s3}$ may be specified as an absolute reference voltage value, or $V_{s3}=V_{ref}+0.3$ V, for example, without changing an output value of the peak holding circuit 24.

By changing the digital control signal to ATT 23 from 4 bits to 6 bits and the attenuation per step from −2 dB to −0.5 dB, finer control may be provided in the range between the upper bound threshold $V_{s1}$ and the lower bound threshold $V_{s2}$.

Figure 4:
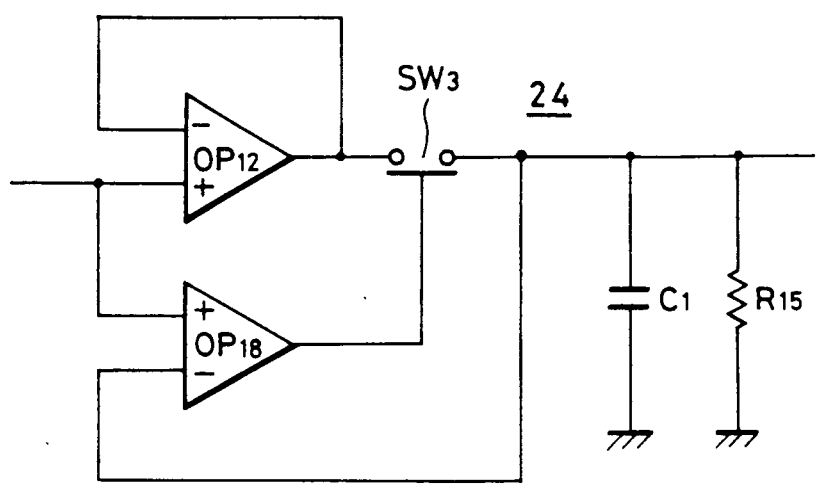
FIG. 4 is a diagram of the peak holding circuit of FIG. 1.

Referring now also to FIG. 4, the peak holding circuit 24 may be changed by adding an operational amplifier $OP_{18}$ and an analog switch $SW_3$ in place of the diode $D_1$ of FIG. 3. This permits fabricating the entire circuit as a MOS chip.

Further, the S/N ratio can be improved by adding hysteresis to the first and second comparators 25, 26. Techniques for doing so are so well known that they do not require description.

As described above, according to the invention, detection and comparison can be performed during changes in measuring distance, mist, dust and the like by automatic control. Therefore erroneous operation is avoided, and stable and accurate detection is ensured at all times.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A photoelectric switch of a type adapted for use with a pulsating light beam having an emission period, comprising:
   means for detecting said pulsating light beam to produce a light detection signal;
   means for attenuating said light detection signal to produce an output signal;
   means for producing a pulsating clock signal synchronized with pulsations of said pulsating light beam only when said output signal exceeds a predetermined upper threshold;
   control means, responsive to said pulsating clock signal, for producing a digital control signal;
   said means for attenuating being responsive to said digital control signal to add a predetermined amount of attenuation each time said pulsating clock signal is produced; and
   means for removing a predetermined amount of attenuation from said light detection signal when said output signal falls below a predetermined lower threshold, whereby said output signal is maintained in a range between said upper threshold and said lower threshold.

2. Apparatus according to claim 1, wherein said means for removing includes:
   a peak holding circuit;
   said peak holding circuit including means for holding a peak value of said output on a time constant that is long compared to said emission period;
   means for comparing an output of said peak holding circuit with a lower bound threshold; and
   said means for comparing being operative to produce a reset signal for resetting said control means when said output of said peak holding circuit is less than said lower bound threshold.

3. Apparatus according to claim 1, wherein said means for attenuating includes a programmable attenuator responsive to said digital control signal for performing attenuation of said light detection signal.

4. Apparatus according to claim 3, wherein:
   said control means includes a counter;
   said counter increasing or decreasing a count therein in response to each pulsating clock signal; and
   said count being said digital control signal.

5. Apparatus according to claim 1, further comprising:
   an amplifier producing said light detection signal; and
   means for changing a gain of said amplifier in response to a maximum attenuation of said means for attenuating whereby a dynamic range of said apparatus is increased.

6. Apparatus according to claim 5, wherein:
   said means for attenuating includes a programmable attenuator responsive to said digital control signal for controlling attenuation;
   said control means includes a counter;
   said counter having a predetermined number of digits;
   said counter being effective for counting alternations of said pulsating clock signal;
   said digital control signal having one digit less than said predetermined number of digits;
   a remaining one of said predetermined number of digits being a most significant bit of said predetermined number of bits;
   said means for changing a gain including at lest one electronically controlled switch for controlling connection of at least one feedback element setting said gain of said amplifier; and
   said electronically controlled switch being controlled by said most significant bit.

7. Apparatus according to claim 1 wherein said means for attenuating includes means for adding successive increments of attenuation.

8. Apparatus according to claim 7, wherein said successive increments are substantially equal.

9. Apparatus according to claim 1, wherein said means for removing includes means for resetting said digital control signal to an initial value when said output signal falls below said predetermined lower threshold.

10. A method for operating a photoelectric switch for use with a pulsating light beam having an emission period, comprising:
    detecting said pulsating light beam to produce a light detection signal;
    attenuating said light detection signal to produce an output signal;
    producing a pulsating clock signal synchronized with pulsations of said pulsating light beam when said output signal exceeds a predetermined upper threshold;
    producing a digital control signal responsive to said pulsating clock signal;
    adding a predetermined amount of attenation each time said pulsating clock signal is produced; and
    removing a predetermined amount of attenuation from said light detection signal when said output signal falls below a predetermined lower threshold, whereby said output signal is maintained in a range between said upper threshold and said lower threshold.

11. A method according to claim 10, wherein the step of removing includes removing substantially all attenuation.

12. Apparatus for detecting the passage of an object through a pulsating light beam, said pulsating light beam having a period, comprising:
    means for detecting said pulsating light beam to produce a light detection signal;
    means for attenuating said light detection signal to produce an output signal;
    means for producing a pulsating clock signal synchronized with pulsations of said pulsating light beam when said output signal exceeds a predetermined upper threshold;
    control means, responsive to said pulsating clock signal, for producing a digital control signal;
    said means for attenuating being responsive to said digital control signal to add a predetermined amount of attenuation each time said pulsating clock signal is produced;
    means for removing a predetermined amount of attenuation from said light detection signal when said output signal falls below a predetermined lower threshold, whereby said output signal is maintained in a range between said upper threshold and said lower threshold;

means for holding a peak of said output signal on a time constant that is long compared to said emission period, to produce a stored peak signal;

means for comparing a decision voltage related to said stored peak signal with said output voltage to produce an alternating final output signal when said object does not intercept said light beam to said means for detecting; and said means for comparing providing a constant final output signal when said object intercepts said light beam, whereby the presence of said object in an intercepting position is detected.

13. Apparatus according to claim 12, wherein a time required for passage of said object through said intercepting position is substantially equal to said emission period, whereby a single alternation of said final output is removed by passage of said object.

14. A method for detecting the passage of an object through a pulsating light beam, said pulsating light beam having a period, comprising:

detecting said pulsating light beam to produce a light detection signal;

attenuating said light detection signal to produce an output signal;

producing a pulsating clock signal synchronized with pulsations of said pulsating light beam only when said output signal exceeds a predetermined upper threshold;

control means, responsive to said pulsating clock signal, for producing a digital control signal;

the step of attenuating including adding a predetermined amount of attenuation each time said pulsating clock signal is produced;

removing a predetermined amount of attenuation from said light detection signal when said output signal falls below a predetermined lower threshold, whereby said output signal is maintained in a range between said upper threshold and said lower threshold;

holding a peak of said output signal on a time constant that is long compared to said period, to produce a stored peak signal;

comparing a decision voltage related to said stored peak signal with a said output to produce a first condition of said final output signal when said object does not intercept said light beam to said means for detecting; and the step of comparing providing a second condition of said final output signal when said object intercepts said light beam, whereby the presence of said object in an intercepting position is detected.

* * * * *